Sept. 8, 1959       T. ZBIKOWSKI       2,903,297
MOTORCYCLE WINDSHIELD MIRROR MOUNTING
Filed Oct. 6, 1958       2 Sheets-Sheet 1
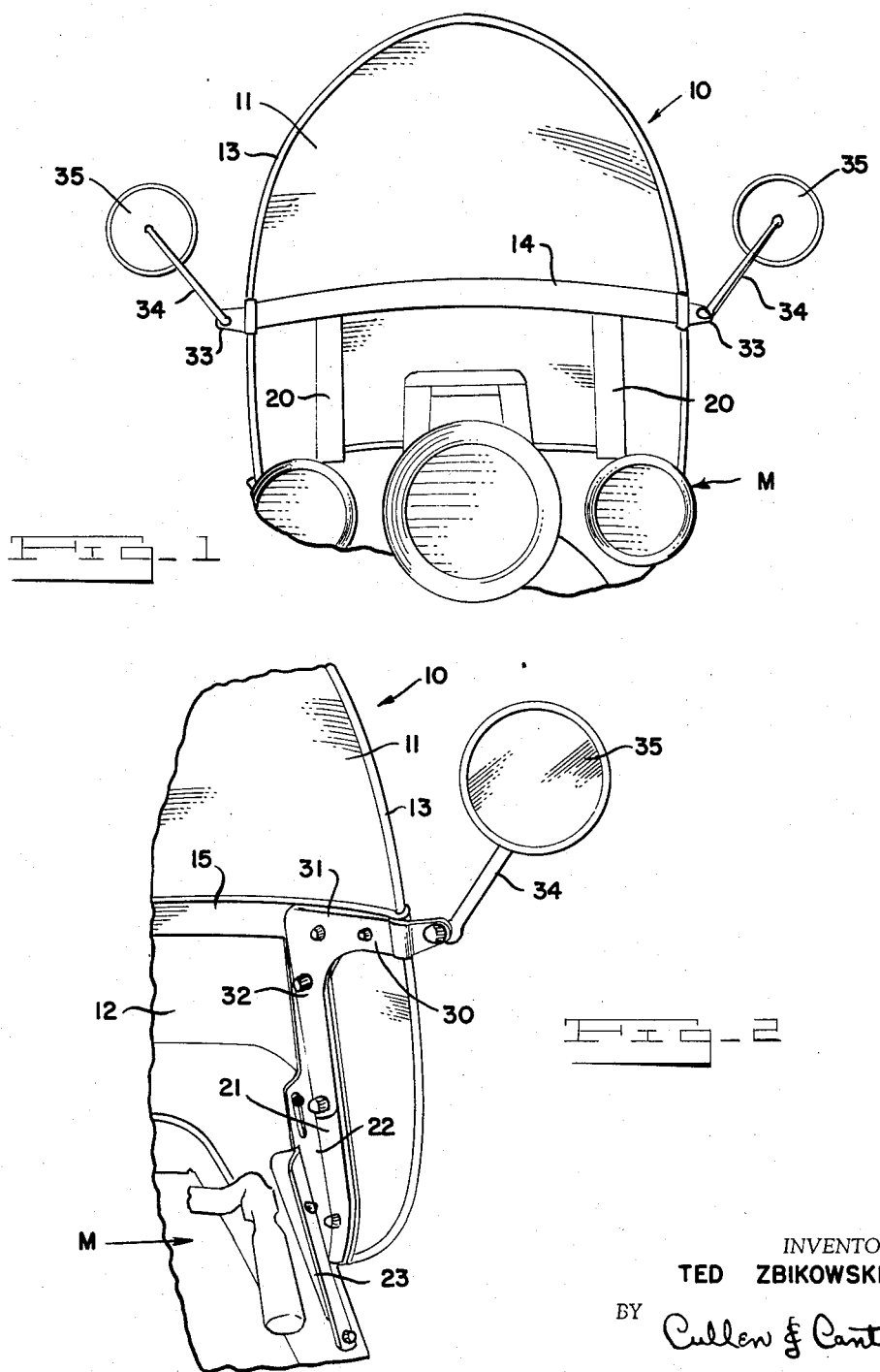
INVENTOR.
TED ZBIKOWSKI
BY Cullen & Cantor
ATTORNEYS Sept. 8, 1959 T. ZBIKOWSKI 2,903,297
MOTORCYCLE WINDSHIELD MIRROR MOUNTING
Filed Oct. 6, 1958 2 Sheets-Sheet 2
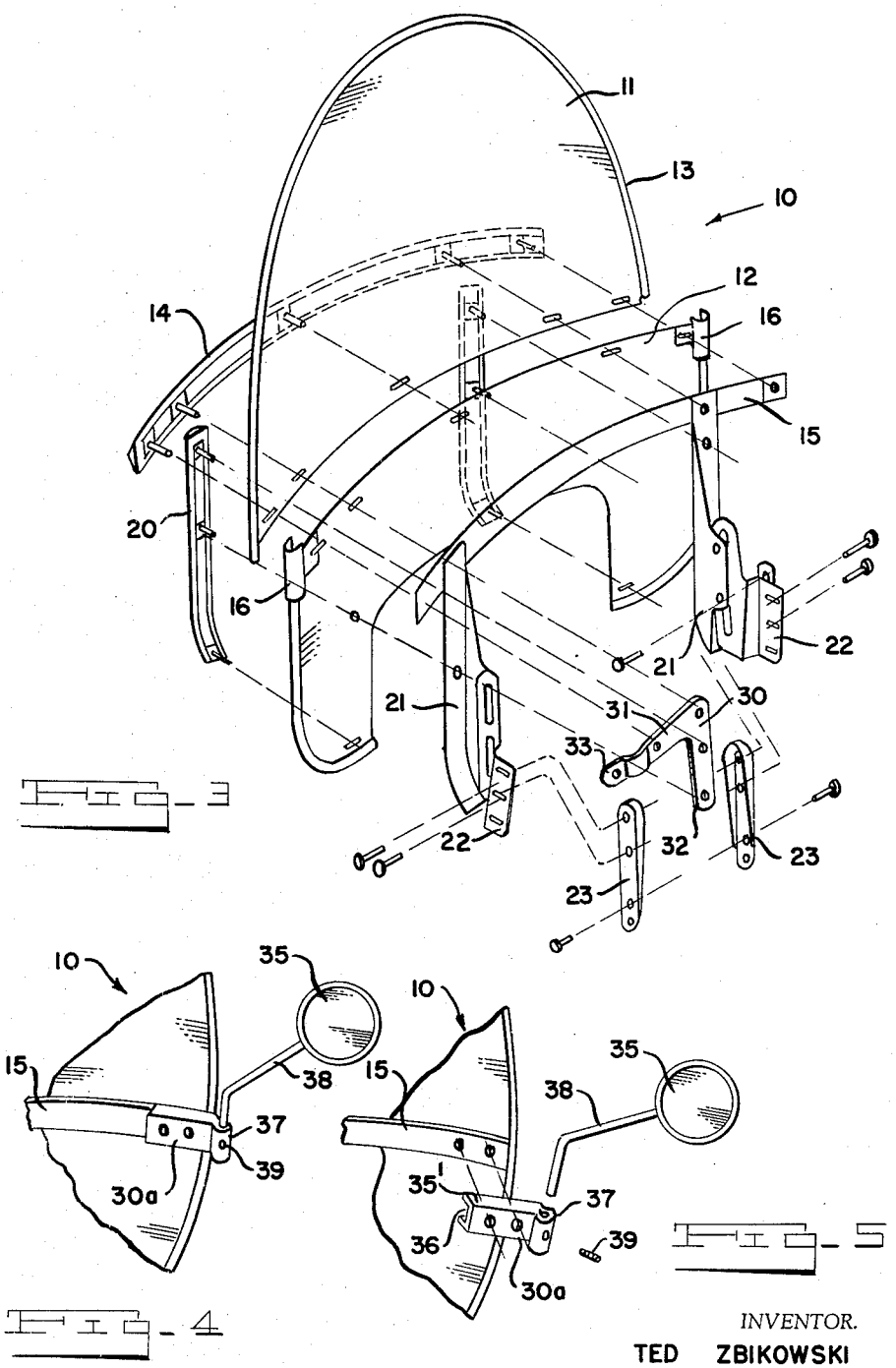
INVENTOR.
TED ZBIKOWSKI
BY Cullen & Canton
ATTORNEYS United States Patent Office 2,903,297
Patented Sept. 8, 1959

2,903,297

MOTORCYCLE WINDSHIELD MIRROR MOUNTING

Ted Zbikowski, Detroit, Mich., assignor to Joseph Buegeleisen Company, Southfield Township, Mich.

Application October 6, 1958, Serial No. 765,581

3 Claims. (Cl. 296—78.1)

This invention relates to a motorcycle windshield mirror mounting and more particularly to a means for rigidly mounting a mirror upon a motorcycle windshield which means also rigidifies the windshield structure.

Motorcycle windshields are normally made of large pieces of transparent plastic material. These windshields are mounted in various ways upon the motorcycle frame, generally in front of the handlebars. Because of the heavy wind loads upon the windshield surface and because of the unusually heavy vibration loads imposed by the motorcycle, the windshield eventually tends to break and wear out. Also, it has not been possible up to date to mount a mirror upon the windshield itself, since the added load of the mirror, both the weight load and wind load, would quickly break the windshield. Previously, motorcycle rear view mirrors have been mounted upon the handlebars.

Thus, it is an object of this invention to provide a means for mounting the rear view mirrors directly upon the windshield where they may be better and more safely used rather than upon the handlebars of a motorcycle.

A further object of this invention is to form a means for mounting a mirror upon a motorcycle windshield, which means rigidly holds the mirror in place regardless of the heavy windloads and vibrations upon the mirror and also rigidifies and strengthens the side edges of the windshield, upon which the greatest loads are normally imposed by wind and vibration.

These and other objects and advantages of this invention will become apparent upon reading the following description of which the attached drawings form a part.

With reference to the attached drawings:

Fig. 1 shows a front elevation view of a portion of a motorcycle and the windshield and mirror mounting thereof.

Fig. 2 is a view of a portion of the rear of the windshield and shows the means for mounting the mirror upon the windshield.

Fig. 3 is an exploded view, in perspective of the various parts.

Fig. 4 is a view, similar to Fig. 2, but of a modification.

Fig. 5 is an exploded view of the device of Fig. 4.

With reference to Fig. 1, the motorcycle is generally designated as M, and the windshield as 10. As shown in Fig. 3, the windshield is usually formed, where possible, of two sections, 11 and 12 having an edge beading 13. One or two mirrors may be secured to the windshield.

The two sections of the windshield are joined together edge to edge with the edges slightly overlapping. A pair of horizontally arranged strips 14 and 15 are arranged to overlap the two overlapped edges of the windshield parts and to sandwich the windshield therebetween. Also, a tubular connector 16 may be provided to envelope the adjacent beaded edges of the two windshield sections.

As shown in Fig. 3, two pair of vertical elongated strips 20 and 21 are provided adjacent to each side edge of the windshield and extend from the horizontal strips down to the bottom of the windshield. These two pairs of strips each are arranged to sandwich the windshield between them. The horizontal strips as well as the vertical pairs of strips are secured together by bolts or the like which extend through the windshield, with holes being provided in the windshield for the passage of the bolts.

A bracket 22 bolted to the vertical strip 21 is in turn connected to braces 23 which are bolted to the motorcycle frame. Hence, the windshield is supported upon the motorcycle frame through the braces 23, brackets 22, and vertical strips 21.

A plate 30 is used to mount the side view mirrors upon the windshield. It is formed of flat rigid metallic material formed in a right angle shape having a leg 31, overlapping the horizontal strips, and a leg 32 overlapping the vertical strips. The two legs are connected to their respective strips, by the bolts that pass through both the horizontal and vertical strips. Hence, the right angle plate serves to form a reenforced connection between the vertical and horizontal strips, and to reenforce the lower corners and sides of the windshield.

The plate terminates in bent lugs 33 to which the support arm 34 of a rear view mirror 35 is connected by a bolt or the like.

With this construction, the mirror is rigidly held upon the windshield despite the forces of wind and vibration, and the windshield is reenforced so that it does not break because of the mirror loads. Also, where two mirrors are desired, two identical plates 30 may be used, one at each side edge of the windshield.

Figs. 4 and 5 show a slight modification wherein the vertical strips have been omitted from the windshield and wherein the plate 30a is bolted only to the horizontal strips. Also, the plate may be provided with side flanges 35' to form a channel 36 which fits over one of the horizontal strips 15 and holds the plate against movement relative to the strips.

The plate terminates in a lug 37 which in this case is illustrated as being a turned socket within which the post 38 of the side view mirror 35 fits. The post is held by a set screw 39 against rotation relative to the lug. Where desired, the lug may be in the same shape as that previously described in connection with Fig. 3.

Separate mounting means for holding the windshield upon the motorcycle may be provided; these mounting means not being illustrated here, these mounting means are conventional and are readily available on the market.

This invention may be further developed within the scope of the following attached claims. Accordingly, it is desired that the foregoing description be read as being merely illustrative of an operative embodiment of this invention and not in a strictly limiting sense.

I now claim:

1. A means for mounting a mirror upon a motorcycle windshield at one side edge of the windshield, comprising a pair of elongated strips arranged horizontally across the windshield, one on each side thereof and at a point remote from both the top and bottom edges of the windshield, the two strips being horizontally alined to sandwich the windshield between them, a second pair of elongated strips arranged substantially vertically one on each side of, near one side edge of, and sandwiching the windshield between them and extending from the horizontal strips towards the bottom edge of the windshield, and a right angle shaped flat rigid plate having a horizontal leg overlapping the horizontal strips and a vertical leg overlapping the vertical strips, the legs being secured to their respective strips and the horizontal strips being fastened together and the vertical strips being fastened together by mechanical fasteners extending through the windshield, the plate horizontal leg extending beyond the side edge of the windshield and terminating in a lug adapted for securement to the support post of a rear view mirror.

2. A construction as defined in claim 1 and including a second pair of vertical strips formed and arranged identically to the first mentioned pair of vertical strips, but near the opposite side edge of the windshield, and a second right angle plate, identical to the first one, but secured to the horizontal strips and second pair of vertical strips.

3. A construction as defined in claim 1 and including means for securing the windshield to a motorcycle frame, said means comprising a flange bent from one of the vertically arranged strips and a bracket having one end secured to the flange and the opposite end formed for attachment to a motorcycle frame.

References Cited in the file of this patent
UNITED STATES PATENTS

| | | |
|---|---|---|
| 1,467,350 | Abbott | Sept. 11, 1923 |
| 1,547,794 | Curry | July 28, 1925 |
| 1,754,540 | Behrendt | Apr. 15, 1930 |
| 2,589,993 | Comiskey | Mar. 18, 1952 |